Patented Jan. 16, 1940

2,187,630

UNITED STATES PATENT OFFICE 2,187,630

ALLOY

Charles J. Schafer, Baltimore, Md.

No Drawing. Application July 9, 1935, Serial No. 30,535. Renewed June 17, 1939

2 Claims. (Cl. 75—122)

An important object of my invention is to produce a metal alloy for various cutting tools and instruments which is superior in quality and which gives better results in actual service than those in use at the present time and which will not be affected by alkalies, acids, or any of the various cutting compounds usually employed when cutting or machining such steels as nickel-chrome or vanadium steels and the like, or the various grades of cast irons. In addition, my aim is to provide an alloy for the making of cutting tools which will withstand speeding up of the lathe or cutting machine to a point where the tool temperature may reach 2,000° F. or even higher and still retain its cutting edge. Modifications of the novel alloy may be produced by varying to some extent the percentages of certain of the ingredients within the limits claimed, as will be more fully set forth hereinafter. For example, by reducing the amount of molybdenum used, the alloy may be made somewhat softer so that it may be hammered, rolled, forged, or worked into various forms.

Another object of my invention is to produce an alloy that will withstand the corrosive effects of the surroundings in which it may be used in that it will not corrode or tarnish, is non-pyrophoric, acid resistant, and may be made magnetic or non-magnetic, and is capable of a high luster. Also, it is practically free from such impurities as carbon, silicon, sulphur and the like materials which interfere with the non-tarnishing and working qualities.

A further object of my invention is the production of an alloy that is suitable for the manufacture of surgical and dental instruments, paper cutting blades, perforators, slitters, punches, tableware, and the like and all kinds of cutting tools, knives and instruments generally as well as machine shop and engineering tools and cutting tools.

A further object of my invention is an alloy suitable for engineering parts generally and in particular such parts appertaining to Diesel, aeroplane, automobile, oil and gas, and all types of internal combustion engines, and also to centrifugals, cams, shafts, propellers, valves, pistons, cylinders, cylinder heads, gears, piston rings, and all classes of machinery parts.

With the foregoing in view, my improved alloy and one method for its production are hereinafter described, but it is to be understood that I do not limit myself to the particular formulas set forth insofar as percentages are concerned and that, within the scope of the appended claims, variations and modifications may be made in order to provide an alloy which will meet the requirements of any particular case in regard to hardness, tensile strength, etc.

I have found that an alloy of the following metals can be economically produced as hereinafter set forth and that such alloy possesses properties and characteristics which make it particularly adaptable for the various purposes and uses herein stated. The metals contained in my improved alloy are as follows:

Columbium-tantalum (combined)
Yttrium
Molybdenum
Zirconium
Iron

The percentage of each of these metals employed in the alloy may vary considerably depending on the particular use to which the alloy is applied. The yttrium and molybdenum contribute similar properties to the alloy and in some cases the use of one of these may be dispensed with, in which case somewhat larger quantities of the other should be used.

In general, the percentages indicated below will cover variations necessary to meet the different requirements and conditions under which my alloy is to be used:

|  | Per cent |
|---|---|
| Columbium-tantalum (combined) | 30–60 |
| Yttrium | 10–30 |
| Zirconium | 10–40 |
| Molybdenum | 2–20 |
| Iron | 2–20 |

As an illustration coming within the variations above noted, I have found that an alloy consisting of the following proportions of these metals will produce an alloy that has great strength and resistance and is well adapted for high speed cutting tools and instruments of various kinds:

|  | Percent |
|---|---|
| Columbium-tantalum (combined) | 55 |
| Yttrium | 15 |
| Molybdenum | 4 |
| Zirconium | 20 |
| Iron | (Balance) |

Variations in the percentages of the ingredients affect the character of the alloy. In general, columbium and tantalum give toughness and tensile strength to the alloy, yttrium acts as an oxidizer hardener and molybdenum also gives hardness and compactness of structure. As before noted, yttrium and molybdenum contribute similar qualities to the alloy and in some cases, one or the other of these may be omitted and slightly larger quantities of the other employed. The metal zirconium also contributes to the hardness and tensile strength of the alloy. Therefore, if my alloy is to be used where great tensile strength and toughness are required without a high degree of hardness, it can be so prepared as to contain a high percentage of columbium and tantalum. In case greater hardness is necessary, the percentage of yttrium or of yttrium and molybdenum should be increased. By such variations in the proportions of the constituents, my alloy can be made to meet the requirements necessary for any of the uses heretofore outlined.

In preparing my alloy, the various metals in a more or less pure state might be used, but some of these are expensive and such a procedure would be very costly. To obviate this difficulty I employ certain ores or minerals which contain the metals I desire and by suitable procedure, these ores are treated to produce the oxides of the metals desired which are then fused together in an electric furnace to form the alloy. Most of the ores I use contain in addition to the principal metal, small quantities of various rare metals which I do not attempt to separate or remove as they do not interfere with or injuriously affect the final alloy.

To obtain the columbium and tantalum oxides, I use the mineral columbite which contains these metals in varying proportions. Preferably an ore containing substantially equal proportions of columbium and tantalum is employed, but one containing a higher percentage of columbium than tantalum or vice versa may be used. In short, in my alloy the amounts of columbium and tantalum need not be equal. It is only necessary that these metals combined, that is, the sum of the same, shall form a certain proportion of the alloy.

To obtain the oxides of yttrium, I employ gadolinite and the zirconium and molybdenum may easily be obtained in the market as oxides, the former as crude zirkite.

In some cases I have found it advantageous to use the residuum from the ores employed to obtain radium, which residuum usually contains about 35% of columbium and about 26% of uranium but no tantalum.

The process I employ in treating the various ores to obtain the oxides is generally the same. It is to be understood, however, that each ore is treated separately to obtain the oxide thereof.

In general the process consists in dissolving the powdered ore in a mixture of hydrochloric and nitric acids in a suitable tank to which heat is applied. After the ore is disintegrated and dissolved, the mass is evaporated to dryness and the temperature increased to drive off the acids. After cooling, it is again treated with hydrochloric acid and heated to boiling and then filtered to remove silica and any other solid impurities. The filtrate is then treated with caustic soda which precipitates the metal as a hydrate which is filtered and thoroughly washed and finally calcined to reduce the metal to the form of oxide. By this procedure I am able to obtain at reasonable cost the oxides of the metals which I then use in the preparation of the alloy.

In preparing my alloy I use an electric furnace of high voltage and amperage so as to obtain a high temperature therein. First I place in the furnace a quantity of scrap steel (preferably old machine turnings) approximately 100 lbs.–200 lbs. This forms the bath for melting the oxides as they are introduced into the furnace. After the scrap steel has been placed in the furnace the temperature is gradually increased until the steel has become a molten and fluid mass, at a temperature above 2900° F. The combined columbium and tantalum oxide with any yttrium oxide contained therein, which is usually present, is mixed with a suitable reducing agent such as aluminum, calcium or magnesium and then added to the bath and the temperature is further increased as fast as this material is melted and absorbed in the fluid mass. The quantity of columbium-tantalum oxide used is approximately 55% of the weight of the mass of molten steel. At this time some yttrium oxide is also added to the extent of about 10%–12% of the original weight of steel. By the time that the columbium and tantalum oxides and the yttrium oxides have been added, the temperature of the bath reaches approximately 3200° F. At this point, addition of the molybdenum is started, the temperature being continually increased. The amount of molybdenum or molybdenum oxide added is about 4% of the original weight of steel. After the molybdenum has been absorbed within the mass I preferably add a small quantity of iron oxide or ferro-silicon to attack any carbon present and to absorb the oxygen and gases if any are present. The temperature by this time has reached between 3700° and 4200° F. and in the event that there is still carbon or silicon shown in the mass, I add a small quantity of barium peroxide or potassium chlorate which further intensifies the heat and also purifies the melt. After this the current is turned off and the temperature is allowed to drop to around 2700°–3000° F. when the zirconium oxide is added to the extent of about 20% of the original weight of steel used. After the zirconium is melted and absorbed the mass is in condition to be poured. The pouring temperature ranges from about 2700°–3500° F. Preferably the mass is allowed to rest for a period of 10–20 minutes after the addition of zirconium before the pouring operation.

It should be stated that during the process of forming the alloy as above described, the original bath of iron is very largely volatilized and disappears so that only a small percentage of the same remains as an ingredient of the alloy. Where the alloy is to contain a considerable percentage of iron, the temperatures used must be somewhat lower than those above set forth, the maximum being not more than 2700° F. In other words, the percentage of iron in the final alloy is controlled by the temperatures used in the operation.

In pouring the alloy from the furnace the metal is preferably run into suitable neutral lined flasks or moulds which serve to cast the same into suitable bars, slabs or ingots having the shape desired. The moulds or flasks are preferably preheated to a temperature of about 1800° F. prior to pouring and after pouring they are preferably placed in a muffle furnace heated to about 1500° F. and in which the temperature is permitted to drop gradually so as to slowly cool the alloy. The alloy is substantially "self-hardening" and no special reheating or complicated methods of heat treatment are necessary; the slow cooling of the metal as described being all that is necessary to obtain the alloy of the properties described.

Having thus described the invention, what is claimed as new and desired to be secured by Letters Patent is:

1. A hard alloy suitable for the manufacture of cutting tools or the like composed of columbium and tantalum combined to the extent of 30% to 60%, yttrium 10% to 30%, zirconium 10% to 30%, molybdenum 2% to 20%, and iron 2% to 20%.

2. A hard alloy suitable for the manufacture of cutting tools or the like composed of columbium and tantalum combined about 55%, yttrium about 15%, zirconium about 20%, molybdenum about 4%, and the balance iron.

CHARLES J. SCHAFER.